J. I. SMITH.
FISHING REEL.
APPLICATION FILED MAY 10, 1918.
1,328,696.　　　　　　　　　　　　Patented Jan. 20, 1920.
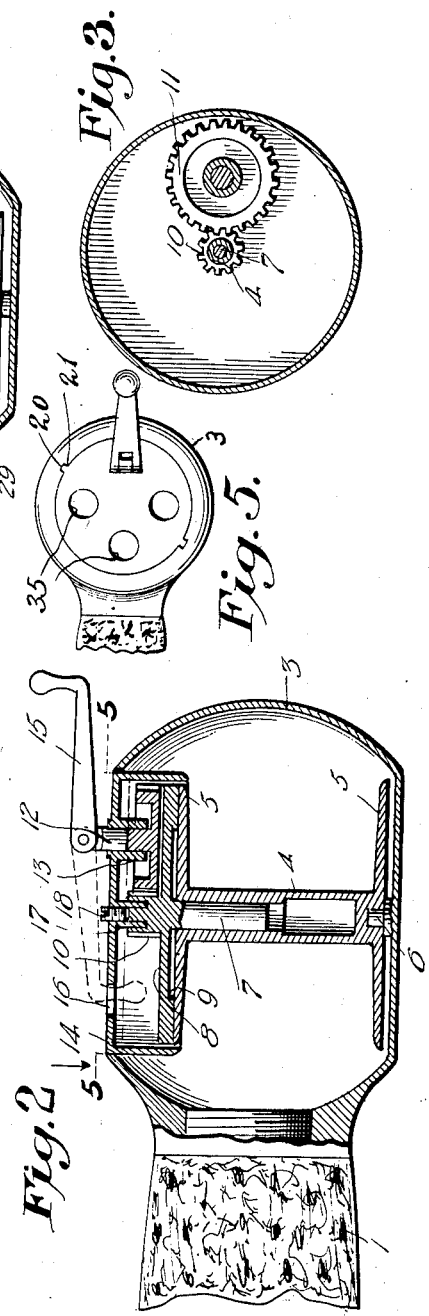
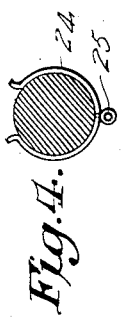
Witnesses
Inventor
Joseph I. Smith,
By
Attorneys

UNITED STATES PATENT OFFICE.

JOSEPH I. SMITH, OF THE DALLES, OREGON.

FISHING-REEL.

1,328,696.  Specification of Letters Patent.  Patented Jan. 20, 1920.

Application filed May 10, 1918. Serial No. 233,676.

*To all whom it may concern:*

Be it known that I, JOSEPH I. SMITH, a citizen of the United States, and a resident of The Dalles, in the county of Wasco and State of Oregon, have invented certain new and useful Improvements in Fishing-Reels, of which the following is a specification.

My invention is an improvement in fishing reels, and has for its object to provide a handle for fishing rods, which may be connected with a telescoping rod or with a rod of any other character, and which carries a reel having a brake and folding means for operating the reel.

In the drawings:

Figure 1 is a plan view, partly in section, of the handle;

Fig. 2 is a section through the reel;

Fig. 3 is a section on the line 5—5 of Fig. 2, looking in the direction of the arrow adjacent the line;

Fig. 4 is a cross section of the rod showing a guide for guiding the line to the reel.

Fig. 5 is a partial side view of the improved rod.

In the embodiment of the invention shown in Figs. 1 to 5, the handle comprises a grip 1 which may be of any suitable material, as, for instance, cork, and is shaped properly to fit the hand, and at one end of the grip is a ferrule 2, which is adapted to encircle the rod to be described and to form a finish for that end of the grip.

At the opposite end of the grip is a casing 3, the said casing being approximately cylindrical in vertical cross section, and within this casing is journaled a reel, the said reel comprising a hollow shaft 4 having at each end a flange or head 5. One of the journal pins 6 of the reel is secured to the casing and engages an axial opening in the adjacent head, and at the opposite end the journal pin 7 is held in the bore of the shaft 4 of the reel.

This journal pin carries at the outer face of the adjacent head a brake disk 8, the said disk, as shown, having at its periphery at the face adjacent to the reel an annular rib 9 which engages the said face of the reel.
The pin carries a pinion 10 at the opposite face of the disk from the head, and with this pinion meshes a second pinion 11 carried on a stub shaft 12 which is journaled in a nipple 13 in a cup shaped gear casing 14.

This cup shaped casing comprises a disk having at its periphery a marginal flange, and the casing fits within an opening in the adjacent end of the casing 3, with the flange extending over the adjacent head 5 of the reel. A handle 15 is hinged to the outer end of the shaft 12, in order that it may fold into the full line or operative position or into the dotted line or inoperative position, and the gear casing 14 has an opening 16 through which the grip of the crank may extend as shown in Fig. 2.

The casing 14 has a nipple 17 which engages an annular groove or recess in the outer end of the pinion 10, and a set screw 18 is threaded into the nipple. By means of this set screw the pressure of the brake disk 8 against the reel head may be varied to the desired degree, and it will be obvious that when the shaft 12 is turned the reel will be rotated.

The gear casing 14 is detachably connected with the casing 3, in order to permit the removal of the gear casing and reel when desired. At the opening for the reel the gear casing has oppositely extending radial lugs 20, and these lugs are adapted to pass through notches 21 in the casing 3 when the reel and gear casing are inserted, and it will be obvious that after turning the gear casing so that the lugs are out of register with the notches or recesses, the gear casing will be locked in the casing 3.

The line 19 winds upon the reel at one end, and when the handle is used with the type of rod shown in Fig. 1, the line may pass through the rod or guide eyes 25 carried by spring clips 24, which may be mounted on the rod 22.

In the construction of Figs. 1 and 2 the outer section of the telescoping rod 22 has threaded engagement with a nipple 29 on the casing 3.

I claim:

A device of the character specified, comprising a substantially cylindrical casing, a reel in the said casing, said reel comprising a shaft provided at each end with a head, one end of the shaft being recessed, a journal pin engaging the said end and provided with a brake disk for coöperating with the head, a cup shaped casing connected with the outer end of the journal pin and inclosing the brake disk, and means for rotating the reel, said means comprising a pinion on the journal pin, a stub shaft journaled in the cup shaped casing and provided at its inner end with a pinion meshing with the pinion of the journal pin, and a handle hinged to the outer end of the stub shaft adapted to fold in either direction, the cup shaped casing having an opening for receiving the grip of the handle, and means for regulating the tension of the brake disk.

JOSEPH I. SMITH.

Witnesses:
FRANCIS V. GALLOWAY,
CARL F. GALLIGER.